(No Model.)

W. A. VAN DEUSEN.
EGG BEATER.

No. 516,415. Patented Mar. 13, 1894.

WITNESSES:
William Miller
Chas. E. Poensgen

INVENTOR:
William A. Van Deusen
BY
Hauff & Hauff
his ATTORNEYS.

THE NATIONAL LITHOGRAPHING COMPANY,
WASHINGTON, D. C.

UNITED STATES PATENT OFFICE.

WILLIAM A. VAN DEUSEN, OF BROOKLYN, NEW YORK.

EGG-BEATER.

SPECIFICATION forming part of Letters Patent No. 516,415, dated March 13, 1894.

Application filed July 21, 1893. Serial No. 481,112. (No model.)

*To all whom it may concern:*

Be it known that I, WILLIAM A. VAN DEUSEN, a citizen of the United States, residing at Brooklyn, in the county of Kings and State of New York, have invented new and useful Improvements in Egg-Beaters, of which the following is a specification.

The object of this invention is to obtain an egg beater which while extremely light will also possess considerable strength and the invention consists in the novel features pointed out in the following specification and claims and illustrated in the annexed drawings, in which—

Figure 1:
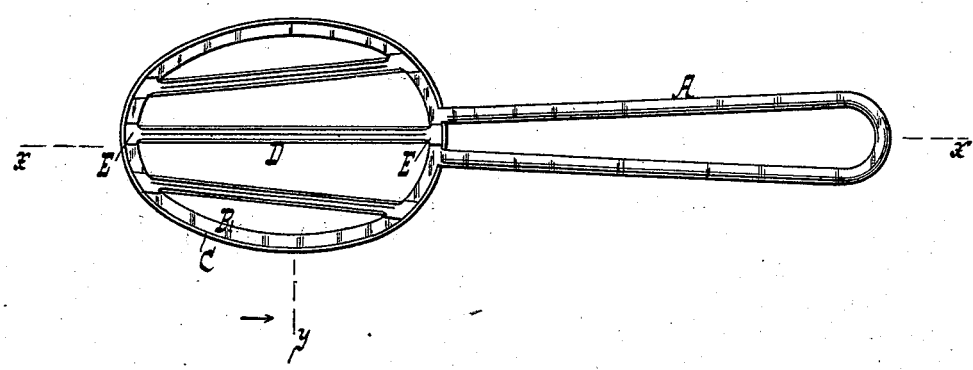
Figure 2:
Figure 3:
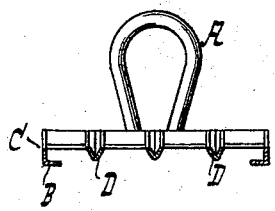

Figure 1 is a plan view of the egg beater. Fig. 2 is a section along $xx$ Fig. 1. Fig. 3 is a section along $yy$ Fig. 1.

The egg beater consists of a suitable handle A having a bowl cut or punched out of sheet metal so as to form a rim B, having the edge bent or turned at an angle to form a flange C. The arms D are formed from sheet metal strips suitably bent or concaved and secured at their ends E to the rim B. By flattening the ends E said ends will sit firmly on the rim.

The forming of the flange C and concaving of the arms D will impart great strength to the device so that it can be made of thin sheet metal which will not only make the device light and cheap, but will also possess the advantage of giving the bowl and the arms sharp or thin edges which will readily cut through the substance which is being beaten.

The handle A can be readily formed from thin sheet metal which when bent or curved will not only be strong and rigid but will also sit comfortably in the hand of the user. The handle may be cut or formed from one piece with the bowl or it may be secured to the bowl in which case the attaching ends of the handle are advantageously flattened so as to sit firmly on the bowl in the manner of the ends E of the arms.

The arms D instead of being separately formed and secured to the bowl might be formed integral or of one piece with the bowl.

What I claim as new, and desire to secure by Letters Patent, is—

1. As an improved article of manufacture an egg beater consisting of a suitable handle and a bowl formed with a rim B and with a flange C integral with the rim, said bowl being provided with sheet metal arms suitably bent or concaved substantially as described.

2. As an improved article of manufacture an egg beater consisting of a suitable handle and a bowl cut out of sheet metal so as to form a rim B and having the edge bent to form a flange C, said bowl being provided with arms formed from sheet metal strips suitably bent or concaved, the ends of the arms being flattened so as to sit firmly on the rim substantially as described.

In testimony whereof I have hereunto set my hand in the presence of two subscribing witnesses.

WILLIAM A. VAN DEUSEN.

Witnesses:
WM. C. HAUFF,
E. F. KASTENHUBER.